(12) United States Patent
Källèn et al.

(10) Patent No.: US 8,074,600 B2
(45) Date of Patent: Dec. 13, 2011

(54) ROTARY PARLOUR FOR AUTOMATIC MILKING OF ANIMALS

(75) Inventors: Elisabeth Källèn, Skärholmen (SE); Malin Nilsson, Stockholm (SE)

(73) Assignee: DeLaval Holding AB, Tumba (SE)

( * ) Notice: Subject to any disclaimer, the term of this patent is extended or adjusted under 35 U.S.C. 154(b) by 73 days.

(21) Appl. No.: 12/529,100

(22) PCT Filed: Jan. 10, 2008

(86) PCT No.: PCT/EP2008/050257
§ 371 (c)(1),
(2), (4) Date: Oct. 19, 2009

(87) PCT Pub. No.: WO2008/104416
PCT Pub. Date: Sep. 4, 2008

(65) Prior Publication Data
US 2010/0095893 A1     Apr. 22, 2010

(30) Foreign Application Priority Data
Feb. 28, 2007   (SE) ....................................... 0700492

(51) Int. Cl.
*A01J 5/003* (2006.01)
(52) U.S. Cl. .................................... 119/14.04; 119/14.1
(58) Field of Classification Search ............... 119/14.03, 119/14.04, 14.08, 14.1, 14.14, 14.18, 14.13, 119/14.15
See application file for complete search history.

(56) References Cited

U.S. PATENT DOCUMENTS

| | | | | |
|---|---|---|---|---|
| 3,835,814 | A | * | 9/1974 | Jacobs et al. ................ 119/14.04 |
| 4,133,437 | A | | 1/1979 | Gates |
| 4,508,058 | A | * | 4/1985 | Jakobson et al. .......... 119/14.02 |
| 5,784,993 | A | * | 7/1998 | Osthues et al. ............. 119/14.04 |
| 5,918,566 | A | * | 7/1999 | van den Berg ............. 119/14.02 |
| 6,041,736 | A | * | 3/2000 | van den Berg et al. ..... 119/14.02 |
| 2002/0033138 | A1 | * | 3/2002 | Brayer ........................ 119/14.03 |
| 2005/0126499 | A1 | * | 6/2005 | Ericsson et al. ............ 119/14.18 |
| 2008/0251024 | A1 | * | 10/2008 | Bos et al. .................... 119/14.18 |
| 2010/0031889 | A1 | * | 2/2010 | Eriksson et al. ........... 119/14.02 |
| 2010/0300362 | A1 | * | 12/2010 | Danneker et al. .......... 119/14.02 |

FOREIGN PATENT DOCUMENTS

| | | |
|---|---|---|
| EP | 689762 | 1/1996 |
| EP | 1523878 | 4/2005 |
| GB | 1336458 | 11/1973 |

OTHER PUBLICATIONS

International Search Report dated Mar. 26, 2008, in PCT application.

\* cited by examiner

*Primary Examiner* — Rob Swiatek
*Assistant Examiner* — Lisa Tsang
(74) *Attorney, Agent, or Firm* — Young & Thompson

(57) ABSTRACT

A rotary parlor for automatic milking of animals includes an annular rotary platform (2) adapted to form a support surface for the animals (1), driving element (9) for supplying a rotary motion to the platform (2), positioning element for arranging the animals in predetermined milking positions (3) on the platform, in which an longitudinal axis (1a) of the animals forms an angle to the direction of motion (1b) of the animals standing on the rotary platform (2), and a robot arm (13) adapted to attach teat cups (7a) to the teats of an animal (1) which has entered a milking position (3) on the platform (2). The entire robot arm (13) is located in a working position vertically above or on the platform (2) when it attaches the teat cups to the teats of the animals (1).

22 Claims, 4 Drawing Sheets

ROTARY PARLOUR FOR AUTOMATIC MILKING OF ANIMALS

THE BACKGROUND OF THE INVENTION AND PRIOR ART

The present invention relates to a rotary parlor for automatic milking of animals, wherein the parlor comprises an annular rotary platform adapted to form a support surface for the animals, driving means for supplying a rotary motion to the platform, positioning means for arranging the animals in predetermined milking positions on the platform, in which a longitudinal axis of the animals forms an angle to the direction of motion of the animals standing on the rotary platform, and a robot arm adapted to attach teat cups to the teats of an animal which has entered a milking position.

In a conventional rotary milking parlor, the cows walk on to an annular rotating platform and enter a milking stall. An operator, who is located on the inside or on the outside of the annular platform, attaches a milking member to the teats of the cows. The platform rotates continuously with a constant low speed such that the milking processes of the cows have been finished when the cows have rotated nearly 360 degrees on the platform. The continuous flow of cows causes rotary parlors to have a high milking capacity. However, a condition for a well working milking parlor is the existence of the operator who manually attaches the milking members to the cows.

EP 689 762 shows a rotary parlor for automatic milking of animals. A robot arm is here used for the attachment of teat cups to cows standing in a milking position on an annular platform. The robot arm is movably arranged on a rail track, which runs in an internal position of the annular platform along a part of its inner periphery. However, the use of such a robot arm is restricted to parlors having milking position for the cows in the driving direction of the platform, such that it is possible for the robot arm to attach the teat cups to the cows from the side. However, a close positioning of the animals on the platform, which is a condition for an effective use of a rotary parlor, is not possible to achieve with such a design of the milking positions.

SUMMARY OF THE INVENTION

The object of the present invention is to achieve a rotary parlor having a construction which makes automatic milking of animals possible with a high milking capacity.

This object is achieved by the rotary parlor initially defined, which is characterized in that the entire robot arm is located in a working position vertically above or on the platform when it attaches the teat cups to the teats of the animals. In order to achieve a close positioning of the animals on a rotary parlor, the animals have here been positioned in more or less inclined milking positions on the platform. Conventional robot arms are adapted to attach the teat cups to animals from a working position located at the side of the animals. Since the robot arm according to the present invention has a working position above the platform, it is able to attach the teat cups to the animals from the side, even if the animals are standing in inclined milking positions on the platform. Thereby, it is possible to use a substantially conventional robot arm for the attachment of the teat cups to the animals. Preferably, the entire robot arm is positioned in a working position located at the side of an animal standing in a milking position such that it easy can attach the teat cups to the teats of the animal. The entire robot arm may be positioned in a working position radially inside the outermost leg of the animal standing in the milking position on the platform and/or radially outside the innermost leg of the animal. Consequently, the robot arm can be used to attach teat cups to animals arranged in a manner that enables a close positioning of the animals on an annular platform. Thus, the rotary parlor provides an automatic milking of animals, which can be performed with a high milking capacity.

According to an embodiment of the invention, the robot arm has an extension from an inner end portion to an outer end portion, wherein the inner end portion of the robot arm is located in an area of an adjacent milking position when the robot arm attaches the teat cups to an animal standing in said milking position. A robot arm can work within a relatively large area. Normally, there is not enough space for accommodation of an entire robot arm in a milking stall occupied by an animal. Thereby, the working position of the robot arm may be at least partly located in an area of an adjacent milking position. Preferably, a vacant area of an adjacent milking position is used for this accommodation.

According to an embodiment of the invention, the rotary parlor comprises a transport device adapted to displace the robot arm between the working position and a resting position located at the side of the platform. The transport device may displace the robot arm to the resting position when the robot arm is not in use. Thereby, the robot arm is not in the way for the platform when it rotates. Furthermore, service of the robot arm may be performed when it is in the resting position. The transport device may be adapted to displace the robot arm in a substantially radial direction in relation to the annular platform between the working position and the resting position. Such a transport device, which provides a straight-line displacement of the robot arm, may be given a relatively simple design. The resting position may be located outside an outer periphery of the annular platform. If the animals are arranged in milking positions such that the teats of the animals are located relatively close to the outer periphery of the annular platform, a resting position outside the outer periphery of the annular platform results in a relatively short displacement of the robot arm between the working position and the resting position. Alternatively, the resting position is located inside an inner periphery of the annular platform. Such a location of the resting position is preferred if the animals are arranged in milking positions such that their teats are located relatively close to the inner periphery of the annular platform.

According to a further embodiment of the invention, the transport device comprises a rail member arranged at a higher level than the robot arm, and elements adapted to connect the robot arm and the rail member such that the robot arm is arranged in a hanging position in the rail member. Such a rail member may be attached in a roof construction of the rotary parlor. Alternatively, the rail member constitutes a part of a stand or the like for supporting the robot arm. The rotary parlor may comprise a mechanism for adjusting the position of the robot arm in a vertical direction. Thereby, it is possible to displace the robot arm to a higher level or lower level. The robot arm may be displaced to a higher level when it is not in use. The robot arm may here be displaced to a higher level than the upper parts of the components on the platform.

According to a further embodiment of the invention, the rotary parlor comprises a control unit adapted to control said driving means such the platform is driven with a substantially constant speed. Such a constant speed is relatively low, such that it is possible for the animals to entry a milking position on the platform in a safe manner. Alternatively, the control unit is adapted to control said driving means such the rotational motion of the platform is stopped when a an animal has to enter a milking position on the platform. Such a control unit may be a computer device provided with a suitable software for this purpose. Since the platform is standing still, it is very easy for an animal to enter a milking stall on the platform. Preferably, the control unit is adapted to activate the transportation device such that it moves the robot arm from the resting position to the working position as soon as an animal has entered a milking position on the platform. Such a motion of the robot arm is relatively easy to perform since the rotational motion of the platform is relatively slow, and it is very easy to perform if the platform has been stopped. The attachment of the teat cups to the teats of the animals is very easy to perform when the platform has been stopped, since there are no relative movements between the robot arm and the animal. However, it is no problem for a robot arm to attach the teat cups to the animal even if the platform is rotated with a slow velocity. The control unit may be adapted to activate the transportation device such that it displaces the robot arm from the working position to the resting position as soon as the robot arm has attached the teat cups to the teats of the animal. Thereby, the robot arm is not in the way for components arranged on the platform during the following rotary motion of the platform. Alternatively, the components on the platform have a design and a location such that the robot arm has possibility to remain in the working position between the attaching processes of the teat cups.

According to a further embodiment of the invention, the animal is adapted to leave the milking stall in an exit position in which the milking position is just in front of an exit area. Preferably, the milking position arrives to said exit position at the same time as another milking position arrives to an enter position. When an animal in a milking position reaches the exit position, the milking process of the animal has been ended and the teat cups have been retracted. Consequently, the animal is ready to leave the platform. Preferably, the area of the milking position is adapted to be vacant for a time period before a new animal enters this milking position. This accessible space may be used for accommodation of the robot arm when it attaches the teat cups to an animal in an adjacent milking stall. Furthermore, it is possible to perform cleaning processes of the teat cups and other milking equipment during such a time period when the milking stall is not occupied by an animal.

According to a further embodiment of the invention, said positioning means are adapted to position the animals in milking positions on the platform with their heads in the vicinity of an inner periphery of the annular platform. In such a case, the animals may have an extension in a completely radial direction on the annular platform or be arranged in a herringbone pattern. Alternatively, said positioning means are adapted to position the animals in milking positions on the platform with their heads in the vicinity of an outer periphery of the annular platform. Such positioning means may be arranged such that it is possible for an animal which enters the milking stall from the outer periphery of the platform to provide a turning motion such that it faces outwards in a milking position on the milking stall. The positioning means may comprise fence arrangements having a substantially radial extension on the annular platform. Such fence arrangements divide the platform into milking stalls in a relatively simple manner. The fence arrangements may comprise a stationary part and a movable part. Such a movable part may be slideably or pivotally arranged in relation to the stationary part. By the use of such a movable part, it is possible to provide an opening in the fence arrangement between the areas of two adjacent milking positions. By providing such an opening in the fence arrangement, it is possible for a robot arm to remain in the working position between the attaching processes of the teat cups to the animals.

According to a further embodiment of the invention, the rotary parlor comprises a feeding trough for each milking position. A feeding trough attracts the animals and facilitates a desired positioning of the animals in a milking position. Consequently the feeding troughs work as positioning means. In certain cases, it could be enough to use feeding troughs as positioning means for positioning the animals in the milking positions on the platform. Thus, the use of fence arrangements on the platform can here be reduced or completely excluded. The rotary parlor may comprise storage means for each milking position storing the teat cups when they are not used. Such storage means may be a teat cup magazine having a location such that the robot arm is able to grip and move them to the teats of an animal standing in a milking position. The rotary parlor may comprise a milk meter for each milking position. A milk meter measures the milk flow during the milking process. When the milk flow drops below a predetermined value, the milking process is finished and a retracting device is activated which retracts the teat cups from the teats of the animals. The rotary parlor may comprise a milk receiver from each milking position. By the use of a milk receiver in each milking position, it is possible to sample and refuse bad milk from an animal. The rotary parlor may comprise cleaning means for each milking position adapted to clean milk equipment after that the animal has left the milking position. Such milking equipment may be teat cups, milk lines, milk meter and milk receiver.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED EMBODIMENTS OF THE INVENTION

Figure 1:
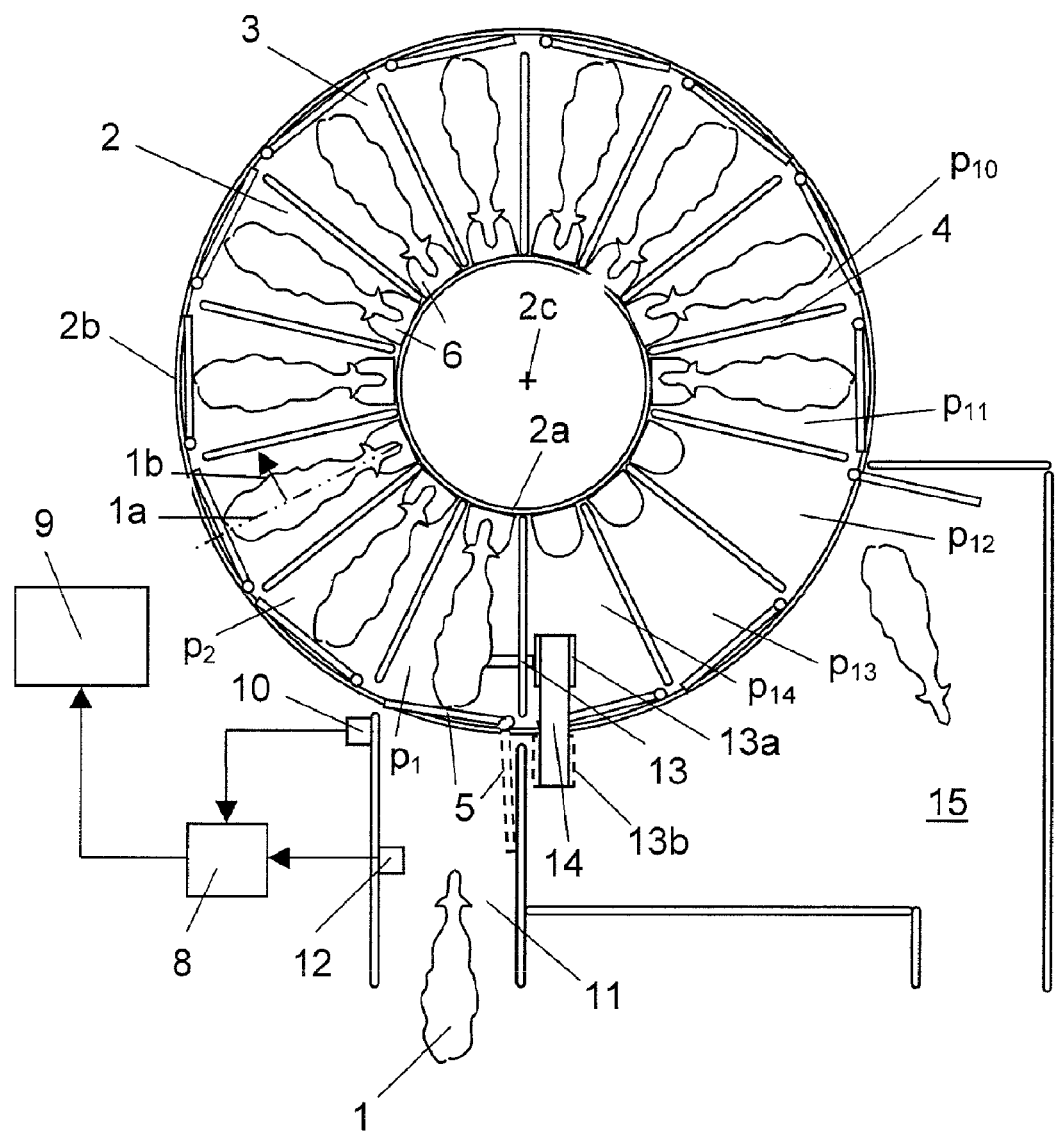
FIG. 1 shows a first embodiment of a rotary parlor for automatic milking of animals.

FIG. 1 shows a rotary parlor for milking of cows 1. The parlor comprises a rotary annular platform 2 having an inner periphery 2a and an outer periphery 2b. The platform 2 rotates around a vertical axis 2c. The platform 2 is arranged to form a support surface for cows 1 during a milking process. The rotary parlor comprises fence arrangements 4 dividing the platform 2 into milking stalls 3 for receiving individual cows 1 in predetermined milking positions. The fence arrangements 4 are arranged at equal intervals around the annular platform 2. The fence arrangements 4 have an essentially straight radial extension on the platform between an inner end located at the vicinity of the inner periphery 2a of the platform and an outer end located at the vicinity of the outer periphery 2b of the platform. In this case, fourteen fence arrangements 4 are used, dividing the platform into fourteen milking stalls 3.

Each milking stall 3 is provided with a gate 5 at the outer periphery 2b of the platform 2. The gates 5 are movably arranged between an open position and a closed position. Each milking stall 3 is provided with a feeding trough 6 arranged in the vicinity of the inner periphery 2a of the platform. Furthermore, each milking stall 3 is provided with milking equipment for providing milking processes of cows standing in a milking position in the respective milking stall. The milking equipment comprises, for example, teat cups, a teat cup magazine, a milk meter, a milk receiver, a removing device and a treatment medium supplying device.

A control unit 8 is adapted to control a drive mechanism 9 for driving of the platform 2. The drive mechanism 9 may include a drive wheel mechanism, which is arranged in contact with a circular rail on the underside of the platform 2. A position sensor 10 is adapted to sense the rotational position of the platform 2 and to send a signal to the control unit 8 about the actual position of the platform 2. The cows 1 carry a transponder containing data about the individual cow 1. An entry passage 11 to the platform 2 is provided with an identification sensor 12 in an entry position. The identification sensor 12 is adapted to identify the cows 1 by means of the information from the transponder and to send a signal to the control unit 8 with information about the identity of the cows 1. The rotary parlor comprises a robot arm 13. The robot arm 13 is displaceably arranged by means of a transport device 14 mounted at a level above the platform 2. The transport device 14 is adapted to displace the robot arm 13 in a radial direction in relation to the platform 2. The transport device 14 is adapted to displace the robot arm 13 between a working position 13a located in a vertical position above or on the annular platform 2 and a resting position 13b located in a radial position outside the outer periphery 2b of the platform. The robot arm 13 is shown with dotted lines in FIG. 1 in the resting position 13b. The cows 1 enter an exit area 15 when they have been milked and leave the platform 2.

A cow 1 to be milked walks to the entry passage 11. The entry passage 11 has a width such that only one cow at a time can be located in a first position of the passage 11. The identification sensor 12 identifies the cow and sends a signal to the control unit 8 with information about the identity of the cow 1. The control unit 8 receives substantially continuously information from the position sensor 10 about the actual rotational position of the platform 2. When a milking stall 3 arrives to a first rotational position $p_1$, which occurs when the milking stall 3 is just in front of the entry passage 11, the control unit 8 sends a signal to the drive mechanism 9 to stop the rotational motion of the platform 2. When the platform 2 has been stopped in the first rotational position $p_1$, the gate 5 of the milking stall 3 is moved to an open position. An open gate 5 is shown with dotted line in FIG. 1. The control unit 8 may control the movements of the gate 5.

When the platform 2 is standing still in the first rotational position $p_1$, the cow 1 enters the milking stall 3. The gate 5 is moved to its closed position as soon as the whole cow 1 is inside the milking stall 3. The feeding trough 6 attracts the cow and facilitates the positioning of the cow in the milking stall 3. The feeding troughs 6 may be movably arranged. By setting the feeding trough 6 in a suitable position, it is possible to adjust the position of the cow 1 in the milking stall 3 to a desired milking position. The animals 1 are arranged in milking positions on the platform 2 such that a longitudinal axis 1a of the animals forms an angle to the direction of motion 1b of the animals. In this case, the longitudinal axis 1a of the animals forms an angle of about 90 degrees to the direction of motion 1b of the animals. The animals 1 stand here in a radial direction on the platform 2 with their heads at the inner periphery 2a of the platform 2. In these milking positions, a rear portion of the cow 1 will be in contact with the gate 5. The transport device 14 displaces the robot arm 13 from the resting position 13b outside the platform 2 to the working position 13a above the platform 2. In the working position 13a, a part of the robot arm 13 is located in an adjacent milking stall 3 to the milking stall 3 in which the cow 1 has entered. The adjacent milking stall 3 is in a last and fourteenth rotational position $p_{14}$. There is no cow in the adjacent milking stall 3, so there is plenty of space in this stall to be used by the robot arm 13.

Figure 2:
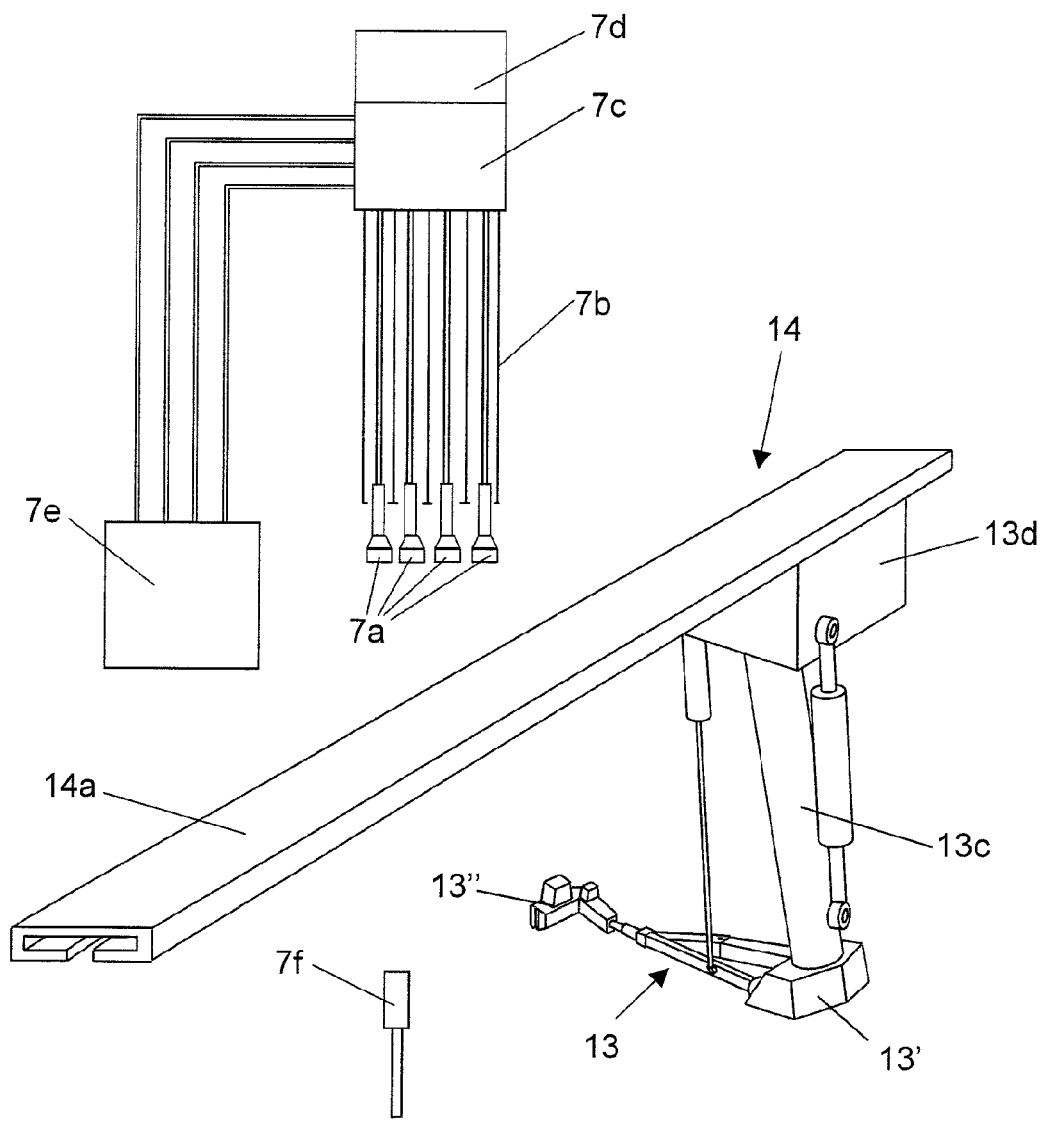
FIG. 2 shows a robot arm for automatic milking of cows and FIG. 3 shows a second embodiment of a rotary parlor for automatic milking of animals and FIG. 4 shows a third embodiment of a rotary parlor for automatic milking of animals.

FIG. 2 shows the transport device 14 and the robot arm 13 in more detail. The transport device 14 comprises a rail member 14a to be mounted at a suitable level above the platform 2. The rail member 14a may be mounted in a roof construction above the rotary parlor. Alternatively, the rail member 14a may be a part of a stand or the like adapted to support the robot arm 13. The robot arm 13 is connected to a rail engaging element 13d movably connected to the rail member 14a in a hanging position. The element 13d or the rail member 14 includes driving means for displacing the robot arm 13 along the rail member 14 between the resting position 13b and the working position 13a. An inner end portion 13' of the robot arm 13 is connected to a suitable mechanism 13c for adjusting the position of the robot arm 13 in a vertical direction. The robot arm 13 comprises a grip device at an outer end portion 13", which is adapted to grip and move teat cups 7a from a storing position in a teat cup magazine 7b to the teats of the cow 1 standing in the milking position in the milking stall 3.

The fence arrangements 4 is provided with at least one relatively large opening in the vicinity of the working position 13a of the robot arm 13. Such a large opening makes it possible for the robot arm 13 to extend into the milking stall 3, which is in the first position $p_1$, from the adjacent milking stall 3, which is in the fourteenth position $p_{14}$. The robot arm 13 comprises a grip device at the outer end portion 13", which grips and moves the teat cups 7a from a storing position in a teat cup magazine 7b to the teats of the cow 1 standing in the milking position in the milking stall 3. Further milking equipment in the milking stall 3, which is shown in FIG. 2, is a milk meter 7c, a removing device 7d, a milk receiver 7e and a medium supplying device 7f.

As soon as the robot arm 13 has attached the teat cups 7a to the teats of the cow 1, the transport device 14 displaces the robot arm 13 back to the resting position 13b. The control unit 8 activates the drive mechanism 9 such that the platform 2 obtains a rotational motion. The rotational motion of the platform 2 is continuous until the following milking stall 3 arrives to the first rotational position $p_1$. The milking stall 3 with the cow 1, which recently was provided with teat cups 7a, is now stopped in a second rotational position $p_2$. The milking process of this cow 1 has just been started. The milking process of this cow 1 is continued during a relatively large number of rotational motions and stops of the platform 2. The milk meter 7c supervises the milk flow during the milking process. As soon as the milk flow drops below a predetermined value, the removing device 7d is activated and it removes the teat cups 7a from the teats of the cow 1. If the teat cups have not been removed earlier, they are at least removed when the milking stall 3 is stopped in an eleventh position $p_{11}$. In the eleventh position $p_{11}$ of the milking stall 3, the treatment supplying device 7f is activated and it sprays a disinfecting medium or another kind of treatment medium to the teats of the cow 1 after that the teat cups 7a have been removed.

When the milking stall 3 is stopped in a twelfth position $p_{12}$, the gate 5 is moved to an open position. The cow 1 leaves the milking stall 3 and enters the exit area 15. A cleaning process of the floor in the milking stall is started. Cleaning water flows on the floor, which may work as a wake up call for the cow to leave the milking stall 3. If a cow 1 has not left the milking stall 3 when it is time for the platform 2 to rotate to a thirteenth position p$_{13}$, the platform 2 will remain in this position and an alarm goes off. In the twelfth position p$_{12}$, a cleaning process may be performed of the teat cups 7a and its lines. Such a cleaning process will be performed after each milking process, with predetermined intervals or when bad milk has been detected during a sampling process. If the sampling process detects that the milk is good, the milk in the milk receiver 7e is conducted to a milk tank. Otherwise, the milk in the milk receiver 7e is refused or sent to a special milk tank.

In the thirteenth position p$_{13}$ of the milking stall, the above-mentioned cleaning processes will continue. A cleaning process of the milk receiver 7e will be started if bad milk has been detected. In the fourteenth position p$_{14}$, the milking stall is mainly used for receiving the robot arm 13 when it is in the working position 13b. However, it is also possible to finish the above-mentioned cleaning processes in this last position.

Thereafter, the milking stall 3 will again be rotated to the first position p$_1$ and be ready for receiving a new cow 1.

Figure 3:
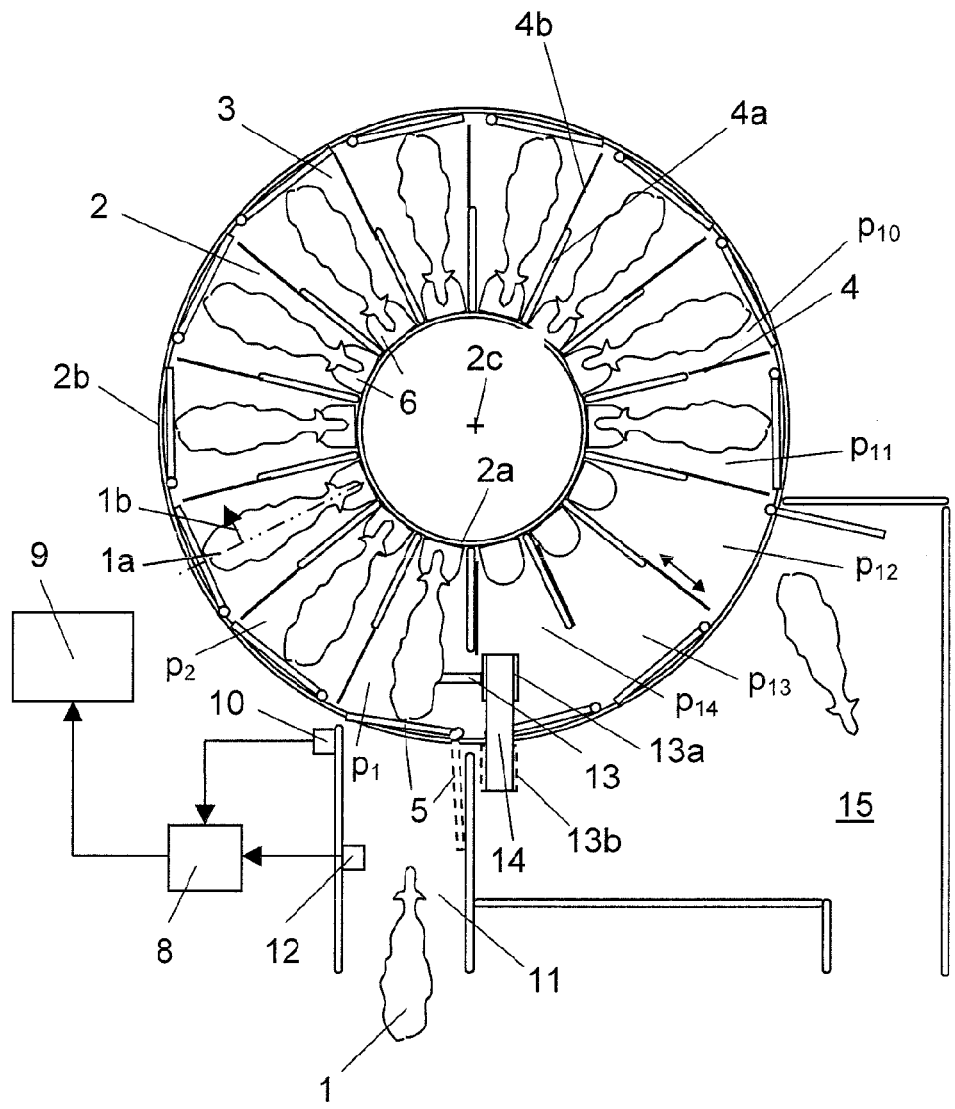

FIG. 3 shows an alternative embodiment of the rotary parlor. In this case, the control unit 8 is adapted to control said driving means 9 such that the platform 2 is driven with a substantially constant speed without stops. The platform is driven with a slow speed such that it is no problem for the robot arm 13 to compensate for the relative motions between the cow 1 on the platform 2 and the robot arm 13 during the attaching process of the teat cups to the cow 1. Furthermore, the fence arrangement 4 comprises a stationary part 4a and a movable part 4b. The movable part 4b of the fence arrangement defines an outer radial part of the fence arrangement 4. The movable part is slideably arranged in a radial direction between an outer position and an inner position. Normally, the movable part 4b is in the outer position such that the fence arrangement 4 has an extension between the outer periphery 2b of the platform and the inner periphery 2a of the platform. However, when a milking stall 3 arrives to the thirteenth position p$_{13}$ or the fourteenth position p$_{14}$, the movable part 4b of the right fence arrangement 4 is displaced to the inner position. Thereby, a relatively wide opening is established in an outer radial part between the milking stalls 3. The opening is dimensioned such that the fence arrangement 4 can pass the robot arm 13 in the working position 13a. As soon as the robot arm 13 has attached the teat cups 7a to the cow in the milking stall 3, the movable part 4b of the fence arrangement is slid back to its outer position. Thereby, it is possible to have the robot arm 13 continuously in its working position when the rotary parlor is used. In this case, the robot arm 13 will be displaced to the resting position only when the rotary parlor not is in use and during service of the robot arm 13. The vertical adjusting mechanism of the robot arm 13 may be used for enabling passing of the milking equipment 7a-f in the milking stall 3.

Figure 4:
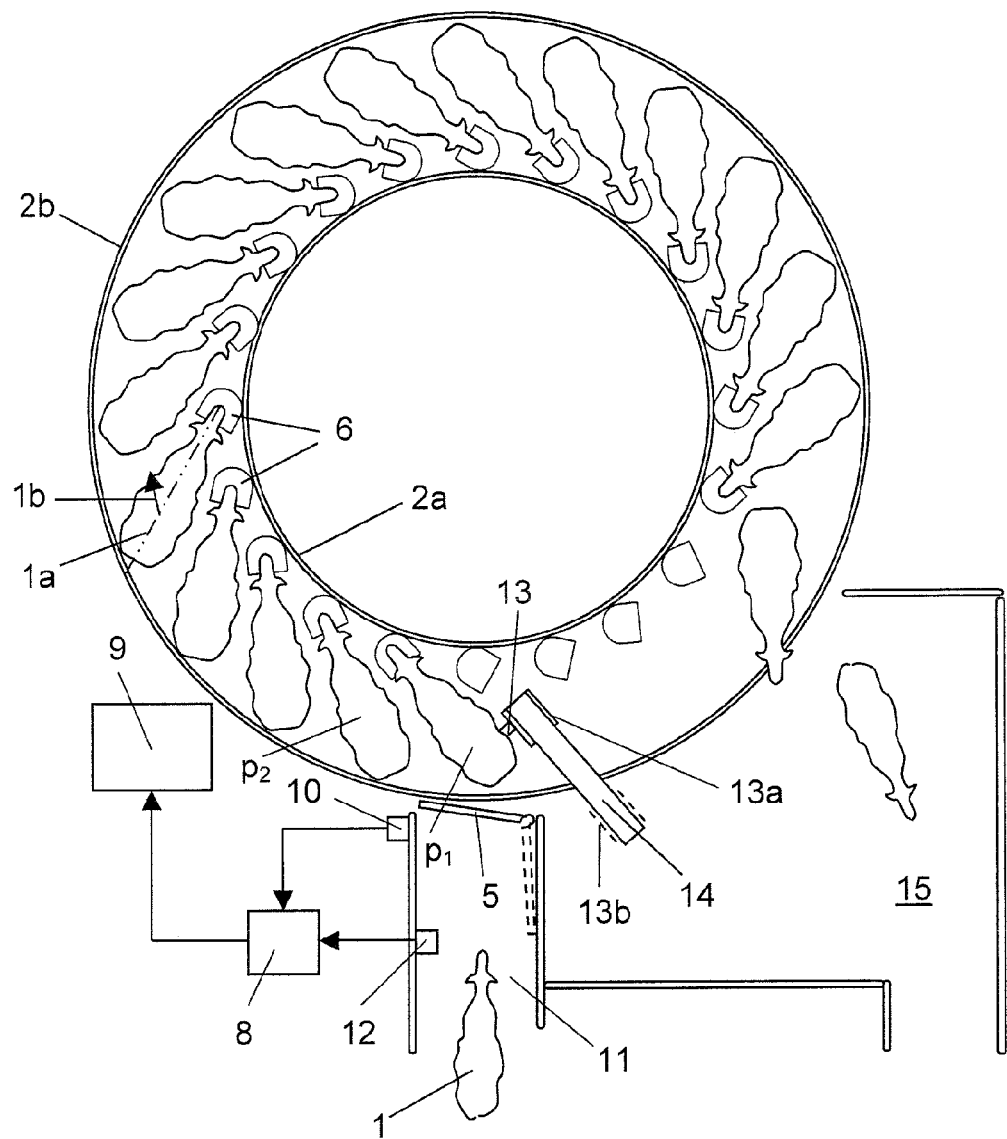

FIG. 4 shows a further alternative embodiment of the rotary parlor. In this case, no fence arrangements are used. In this case, only the feeding troughs 6 are used for positioning the cows 1 in predetermined milking positions along the platform 2. The feeding troughs 6 are positioned with an inclination on the platform 2 such that the cows will be positioned in correspondingly inclined milking positions along the platform 2. The longitudinal axis 1a of the cows forms here an angle to the direction of motion of the cows 1 on the platform 2 which is less than 90 degrees. In this case, the cows are positioned in a herringbone pattern along the annular platform 2. The entire robot arm 13 is located in a working position vertically above the platform 2 when it attaches the teat cups to the teats of the cows 1. The inner end portion 13' of the robot arm is located in an area of an adjacent vacant milking position when the robot arm 13 attaches the teat cups to a cow 1 standing in a milking position in the first rotating position p$_1$. Since the rotary parlor comprises no fence arrangements, it is possible for the robot arm to remain in the working position between the attaching processes of the teat cups to the cows 1.

The invention is not restricted to the described embodiment but may be varied freely within the scope of the claims. In the above embodiments, the animals are positioned in milking positions in which they have their heads in the vicinity of an inner periphery of the annular platform. It is also possible to position the animals in milking positions in which they have their heads in the vicinity of an outer periphery of the annular platform. Furthermore, it is certainly possible to position the animals in milking position without fence arrangement when they are standing in a radial direction on the annular platform. In a corresponding manner, it is possible to use fence arrangements for position the animals in milking position when they are arranged in a herringbone pattern.

The invention claimed is:

1. A rotary parlor for automatic milking of animals, comprising:
    an annular rotary platform (2) adapted to form a support surface for the animals (1),
    driving means (9) for supplying a rotary motion to the platform (2),
    positioning means (4, 6) for arranging the animals (1) in predetermined milking positions (3) on the platform (2), in which a longitudinal axis (1a) of the animals forms an angle greater than zero degrees to the direction of motion (1b) of the animals standing on the rotary platform (2),
    a radially-displaceable robot arm (13) adapted to attach teat cups (7a) to the teats of an animal (1) which has entered a milking position (3) on the platform (2), wherein the entire robot arm (13) is located in a working position (13a) vertically above or on the platform (2) when the robot arm (13) attaches the teat cups (7a) to the teats of the animals (1), and
    a transport device (14) comprising a rail member (14a) arranged at a higher level than the robot arm (13), a rail engaging element (13d) movably connected to the rail member (14a) in a hanging position, a vertical position adjusting mechanism (13c) connected to the rail engaging element (13d), an end of the robot arm being connected to the vertical position adjusting mechanism (13c) such that the robot arm (13) is arranged in a hanging position on the rail member (14a), wherein,
    the rail engaging element (13d) is adapted to be radially displaced between i) the working position (13a) at a first radial position inside an outer periphery (2b) of the platform (2), and ii) a resting position (13b) along the outer periphery (2b) of the platform (2), and
    a radial displacement of the rail engaging element (13d) between the working position and the resting position correspondingly radially displaces the vertical position adjusting mechanism (13c) and the robot arm (13) between i) the working position (13a) at the first radial position inside an outer periphery (2b) of the platform (2), and ii) the resting position (13b), wherein in the working position (13a) the robot arm (13) attaches the teat cups (7a) to an animal (1) standing in said milking position (3), and the entire robot arm is located entirely inside the outer periphery (2b) of the platform (2).

2. The rotary parlor according to claim 1, wherein,
    the robot arm (13) is adapted to move, via the rail member (14a), between the working position (13a) and the resting position (13b) wherein in the resting position the entire robot arm (13) is located radially outside an outer periphery (2b) of the annular platform.

3. The rotary parlor according to claim 1, wherein the robot arm (13) is movably arranged in the working position (13a) such that the robot arm (13) is able to grip and move teat cups (7a) from a storing position to the teats of an animal (1).

4. The rotary parlor according to claim 1, further comprising a control unit (8) adapted to control said driving means (9) such that the platform (2) is driven with a substantially constant speed.

5. The rotary parlor according to claim 1, further comprising a control unit (8) adapted to control said driving means (9) such that the rotational motion of the platform (2) is stopped when an animal (1) has to enter a milking position (3) on the platform (2).

6. The rotary parlor according to claim 1, further comprising a milking stall (3), and wherein the animal (1) is adapted to leave the milking stall (3) in an exit position ($p_{12}$) in which the milking stall (3) is just in front of an exit area (15).

7. The rotary parlor according to claim 1, wherein said positioning means (4, 4a, 4b) are adapted to position the animals in milking positions (3) on the platform (2) with their heads in the vicinity of an inner periphery (2a) of the annular platform (2), said positioning means comprising a feeding trough (6) located at the inner periphery (2a) of the annular platform (2) for each milking position (3).

8. The rotary parlor according to claim 1, further comprising storage means (7b) for each milking position (3) for storing the teat cups (7a) when the teat cups not are used.

9. The rotary parlor according to claim 1, further comprising a milk meter (7c) for each milking position (3).

10. The rotary parlor according to claim 1, further comprising a milk receiver (7e) for each milking position (3).

11. The rotary parlor according to claim 1, further comprising cleaning means for each milking position (3) adapted to clean milking equipment (7) after the animal (1) has left the milking position (3).

12. The rotary parlor according to claim 1, wherein the positioning means (4, 6) arrange the animals (1) in the predetermined milking positions (3) on the platform (2) with the longitudinal axis (1a) of the animals forming a 90 degree angle to the direction of motion (1b) of the animals standing on the rotary platform (2).

13. The rotary parlor according to claim 1, wherein the positioning means (4, 6) arrange the animals (1) in the predetermined milking positions (3) on the platform (2) with the longitudinal axis (1a) of the animals forming more than a 90 degree angle to the direction of motion (1b) of the animals standing on the rotary platform (2).

14. The rotary parlor according to claim 1, wherein said positioning means (4, 4a, 4b) are adapted to position the animals in milking positions (3) on the platform (2) standing in a radial direction with their heads in the vicinity of an inner periphery (2a) of the annular platform (2) and a rear portion of the animals in contact with a gate (5) at the outer periphery (2b) of the annular platform.

15. The rotary parlor according to claim 14, wherein the positioning means comprise fence arrangements (4, 4a, 4b) having a substantially radial extension on the annular platform (2).

16. The rotary parlor according to claim 15, wherein the fence arrangements each comprise a stationary part (4a) and a movable part (4b) extending in a radial direction from the inner periphery to the outer periphery of the platform, the movable part (4b) defining an outer radial part of each fence arrangement.

17. The rotary parlor according to claim 1, wherein the resting position (13b) is located at a second radial position outside the outer periphery (2b) of the platform (2).

18. The rotary parlor according to claim 17, wherein,
the rail member (14a) is positioned extending in a substantially radial direction in relation to the annular platform (2) with a first distal end located inside the outer periphery (2b) of the platform (2) and a second distal end located outside the outer periphery (2b) of the platform (2), and
the radial displacement of the rail engaging element (13d) on the rail member (14a) displaces the robot arm (13) in the substantially radial direction in relation to the annular platform (2) between the working position (13a) and the resting position (13b).

19. The rotary parlor according to claim 17, wherein the control unit (9) is adapted to activate the transport device (14) such that the control unit (9) moves the robot arm (13) from the resting position (13a) to the working position (13b) as soon as an animal (1) has entered a milking position (3).

20. The rotary parlor according to claim 19, wherein the control unit (9) is adapted to activate the transport device (14) such that the control unit (9) displaces the robot arm (13) from the working position (13a) to the resting position (13b) as soon as the robot arm (13) has attached the teat cups (7a) to the teats of the animal (1).

21. A rotary parlor for automatic milking of animals, comprising:
an annular rotary platform (2) forming a support surface for the animals (1);
driving means (9) arranged to supply a rotary motion to the platform (2);
positioning parts (4, 6) defining predetermined animal milking positions (3) on the platform (2), said positioning means comprising a feeding trough (6) located at an inner periphery (2a) of the annular platform (2) for each milking position (3);
a radially displaceable robot arm (13) adapted to attach teat cups (7a) to the teats of an animal (1) which has entered a milking position (3) on the platform (2) wherein the robot arm (13) has an extension from an inner end portion (13') to an outer end portion (13"); and
a transport device (14) comprising a rail member (14a) arranged at a higher level than the robot arm (13), the rail member (14a) positioned extending in a substantially radial direction in relation to the annular platform (2) with a first distal end located inside the outer periphery (2b) of the platform (2) and a second distal end located outside the outer periphery (2b) of the platform (2), the robot arm (13) arranged in a hanging position on the rail member (14a), wherein,
the transport device (14) is adapted for radially displacing the robot arm (13) between a working position (13a) where the robot arm (13) attaches the teat cups (7a) to the teats of the animals (1) and a resting position (13b),
wherein in the working position, the entire robot arm (13) is located at a first radial position entirely inside the outer periphery (2b) of the platform, and
in the resting position (13b) the robot arm (13) is located in a second radial position outside the outer periphery (2b) of the platform (2).

22. A rotary parlor for automatic milking of animals, comprising:
an annular rotary platform (2) adapted to form a support surface for the animals (1), the annular rotary platform (2) having an inner periphery (2a) and an outside periphery (2b);

driving means (9) for supplying a rotary motion to the platform (2);

positioning means (4, 6) for arranging the animals (1) in predetermined milking positions (3) on the platform (2), a radially-displaceable robot arm (13) adapted to attach teat cups (7*a*) to the teats of an animal (1) which has entered a milking position (3) on the platform (2), wherein the robot arm (13) is located in a working position (13*a*) vertically above or on the platform (2) when the robot arm (13) attaches the teat cups (7*a*) to the teats of the animals (1); and a transport device (14) positioned outside the outer periphery (2*b*) of the platform (2) and comprising a rail member (14*a*) extending radially over the rotary platform (2), the robot arm (13) hanging from the rail member via a rail engaging element (13*d*) radially movably connected to the rail member in a hanging position for radially displacing the robot arm (13) between i) a radially outer position of the platform corresponding to a resting position of the robot arm (13) and ii) a radially inner position of the platform corresponding to the working position, wherein, by radial movement of the rail engaging element (13*d*) along the rail member, the robot arm (13) is radially displaced between i) the working position (13*a*) at the radially inner position, and ii) the resting position (13*b*) at the radially outer position, and wherein, in the working position (13*a*), the entire robot arm is located entirely inside the outer periphery of the platform (2).

* * * * *